United States Patent [19]

Spillman

[11] Patent Number: 4,660,762

[45] Date of Patent: Apr. 28, 1987

[54] METHOD AND APPARATUS FOR SPRAYING A TARGET SURFACE

[75] Inventor: John J. Spillman, Bedford, England

[73] Assignee: National Research Development Corporation, London, England

[21] Appl. No.: 758,090

[22] Filed: Jul. 23, 1985

[30] Foreign Application Priority Data

Jul. 23, 1984 [GB] United Kingdom ................ 8418722

[51] Int. Cl.[4] ............................................ B05B 15/04

[52] U.S. Cl. ........................................ 239/1; 47/1.7; 239/172; 239/288; 244/136

[58] Field of Search ............ 239/171, 172, 288–288.5, 239/1; 47/1.5, 1.7; 244/136

[56] References Cited

U.S. PATENT DOCUMENTS 3,512,714 5/1970 Phelps et al. .................. 239/172 X
3,933,309 1/1976 Odegaard ........................... 239/171

FOREIGN PATENT DOCUMENTS 1513711 6/1978 United Kingdom .
2103251 2/1983 United Kingdom .

*Primary Examiner*—Andres Kashnikow
*Attorney, Agent, or Firm*—Cushman, Darby & Cushman

[57] ABSTRACT

Method and apparatus for spraying a target surface, especially a penetrable surface like the canopy of a standing crop. The spray nozzles, mounted on a suitable vehicle, are moved over the surface and an arcuate shield, with its concave side facing towards the target, is mounted close to each nozzle on the side of that nozzle remote from the target. The effect of the movement of the shield upon the air lying between it and the target surface is to induce in that air a component of movement towards the surface, so improving the incidence upon the surface of the spray from the associated nozzle. The air movement may also tend to deflect the canopy, so helping to expose regions of the crop beyond the canopy. Such exposure can be promoted still further by mechanical deflectors. The arcuate shields may be of aerofoil section and the specification describes modified designs in which a shield comprises a series of elements with gaps between them, the envelope of all the elements having an aerofoil outline.

8 Claims, 7 Drawing Figures

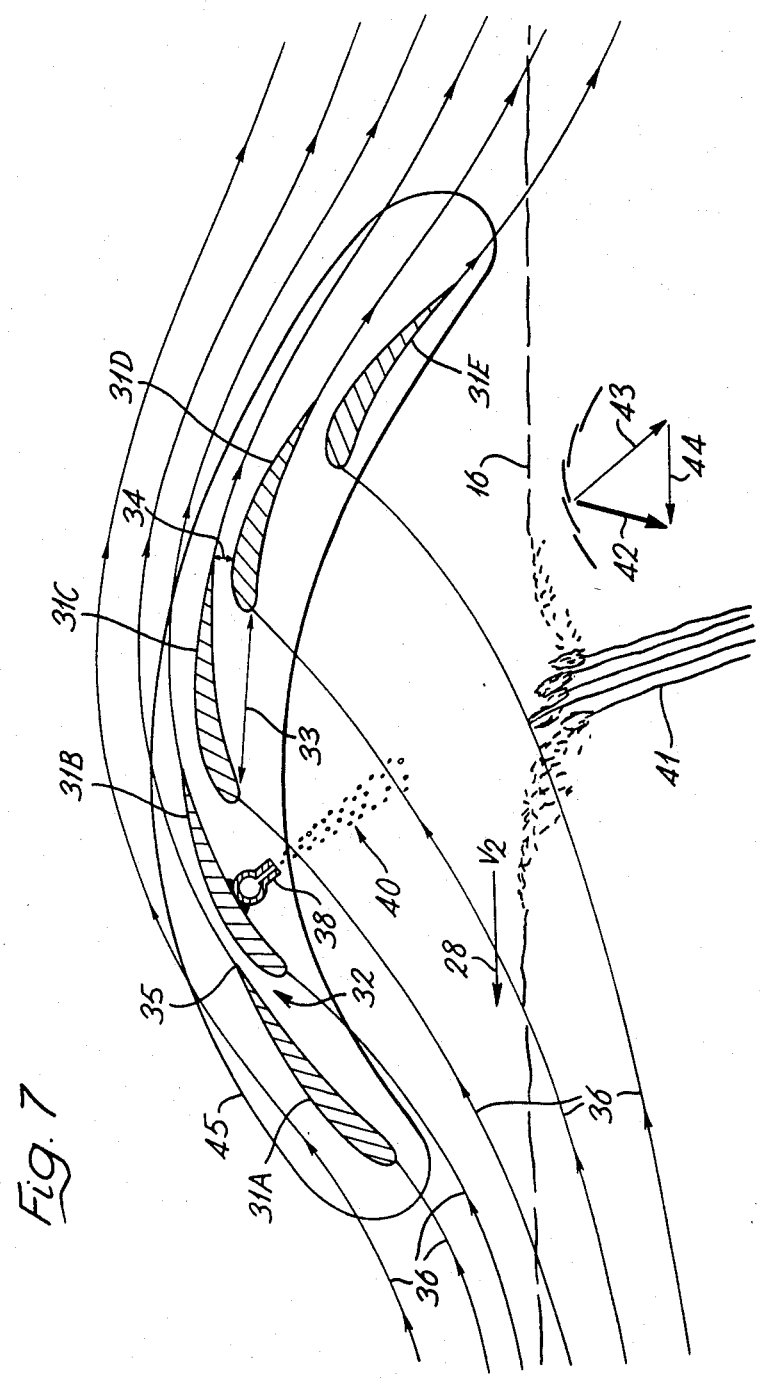

METHOD AND APPARATUS FOR SPRAYING A TARGET SURFACE

This invention relates to spraying processes and apparatus for carrying out such processes. It relates in particular to the spraying of standing crops, using arrays of nozzles mounted on land-based vehicles or low-flying aircraft. Commonly the nozzles of such an array are arranged in rows or ranks mounted on a supporting boom beneath the wing of an aircraft, or projecting transversely from a land vehicle, so that it lies at right angles to the direction of motion of the vehicle carrying it.

It is often advantageous for the nozzles to atomise the liquid and so spray it in the form of droplets of small size: decreasing drop size tends to improve evenness of cover and diminish the danger of damaging the crop. However a disadvantage of small droplets is that their momentum when first formed is small: too large a fraction of them tends not to penetrate deeply into the crop, as ideally it should do, but to come to rest on the upper leaves or even to be blown off target, possibly causing damage to an adjacent area. This is especially true where the crop is sprayed from above and is of the kind presenting a deep and thick uppermost layer, consisting mostly only of leaves and known as the canopy.

The present invention aims to improve the efficiency with which a spray penetrates such a crop, by associating with the spray a structure which moves with it. This structure interacts with the air into which the droplets pass after leaving the nozzle, causing that air and the droplets within it to move towards and into the crop. According to the invention a method of spraying the canopy of a crop, or some other penetratable surface of a target for the spray, comprises locating at least one nozzle in air close to the target surface and directing it towards that surface, creating relative motion between the nozzle and the surface in a direction parallel to the surface, and associating with the nozzle a guiding surface which interacts with the air so that as the nozzle traverses the surface the air which follows the nozzle and lies between it and the target surface is caused to move towards and through that surface, so promoting penetration of the target by the spray. The target may be stationary and the nozzle may be moved over it, and typically the target surface will be horizontal and will be sprayed from above.

The invention also includes apparatus for carrying out such a method, and comprising at least one spraying nozzle mounted on a vehicle of on other means for moving it relative to a stationary and horizontal target surface, and a shield of generally arcuate section arranged on the side of the nozzle remote from the target. The shield may be angled so that the vertical clearances between the target surface and the forward and rearward ends respectively of the shield may be unequal, the clearance at the forward end being the greater.

The shield is preferably of aerofoil section, and so set in use that when moved by the vehicle horizontally, and close to the target surface, the effect is to create in the air between the aerofoil and the target surface a movement of air in the same direction as that in which the aerofoil itself is moving.

The shield may be made up of a plurality of elements, each preferably of aerofoil section, the elements being arranged in interrupted succession from fore to aft so that the envelope of the elements conforms to the outline of a highly-cambered aerofoil, with gaps between adjacent elements. The rear end of the section of each more forward element may horizontally overlap and vertically overlie the forward end of the adjacent and following element, the two elements being so arranged that their confronting surfaces define a gap of steadily decreasing clearance for air passing through in the fore-to-aft direction, that is to say the direction in which air will tend to be forced through the gap as the shield is moved forwardly through the air in use.

The invention will now be described, by way of example, with reference to the accompanying drawings in which:

FIG. 7 is a view similar to FIG. 4 but showing an alternate embodiment.

Figure 1:
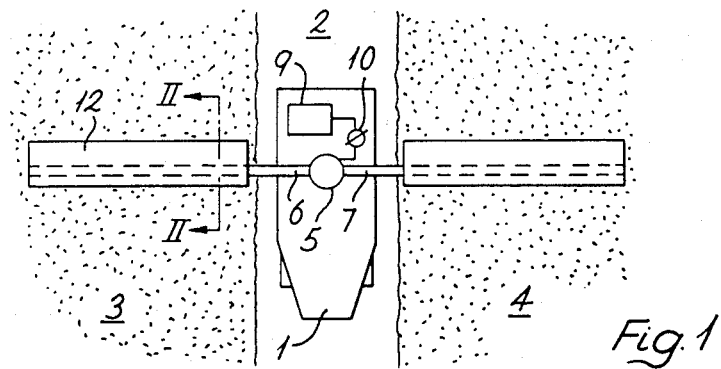
FIG. 1 is a diagrammatic plan view of a crop-spraying vehicle.

FIG. 1 shows a wheeled vehicle 1 travelling down an aisle 2 between two beds 3, 4 of crops to be sprayed. A mast 5 rises from the middle of vehicle 1 and two booms 6 and 7 reach out transversely in opposite directions from mast 5, so that they overlap crop beds 3 and 4 respectively. As other Figures show, nozzles 8 are mounted on the booms 6 and 7, and the crops in beds 3 and 4 are sprayed by liquid delivered to these nozzles from a tank 9 on the vehicle, from which the liquid is pumped by a pump 10 through the hollow interior of the mast 5 and of the two booms. The nozzles 8 atomise the liquid and spray it on to the crops in the form of a rain of fine droplets.

Figure 2:
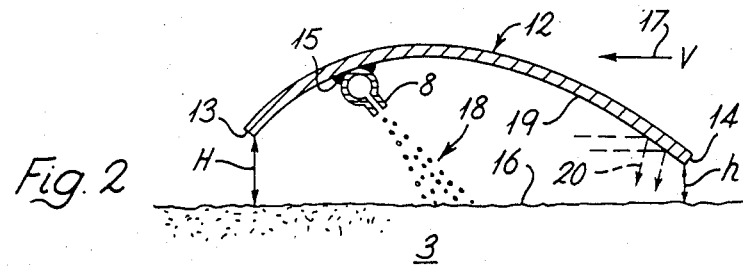
FIG. 2 is a section on the line II—II in FIG. 1.

As FIG. 2 shows more clearly, a shield 12 of generally arcuate section, presenting a leading edge 13 and a trailing edge 14, is welded or otherwise secured along a line contact 15 with the upper surface of each boom: the boom 5 is shown in FIG. 2. The shield 12 and the top surface 16 of the canopy of the crop 3 are shown in the relative positions they will occupy during use, when the shield will be moving relative to the crop at a velocity V, and in the direction of arrow 17. The vertical clearance H between surface 16 and forward edge 13 is greater than the corresponding clearance H between the traling edge 14 and the same surface, and this difference means that a body of air that has just received the spray 18 from nozzle 8 makes impact with the sloping under surface 19 of the shield 12. This impact tends to propel the air, and the spray that it contains, downwardly as diagrammatically illustrated by arrows 20, and this downward motion helps to improve the efficiency with which the spray penetrates into and through the crop canopy.

Figure 3:
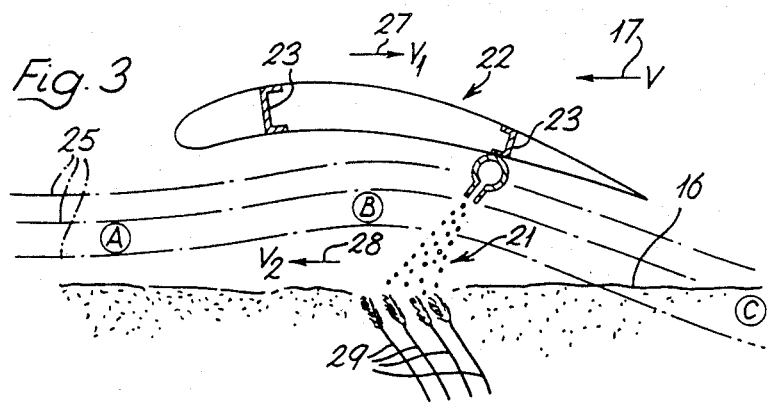
FIG. 3 is similar to FIG. 2, but through an alternative construction.

FIG. 3 differs from FIG. 2 firstly in that the spray 21 is aimed forwardly and downwardly, instead of backwardly and downwardly. Secondly in that the shield 22 is now hollow with internal stiffening spars 23, and of true aerofoil section, in place of the simple arcuate shape of FIG. 2. Where a shield of such shape moves with velocity V, relative to the crop 3 and to the air above it, a streamlined movement between the aerofoil and the air immediately beneath it will tend to be set up as indicated schematically by lines 25. This relative movement has important consequences for the absolute movement of the masses of air concerned, which we will assume to have been still before the approach of the aerofoil. Vertically the movement of the aerofoil shield causes the mass of air originally at height A to rise to height B when the mid-chord of the aerofoil is directly above it and then, as the aerofoil passes oover, to fall to level C which lies below surface 16 within the crop canopy, so carrying with it into the crop the spray that it has received from nozzle 8.

The significant horizontal effect of the movement of the aerofoil upon the air through which it passes arises from the fundamental fact that where air is in streamline flow relative to an aerofoil in its path the relative velocity of the air over the upper surface of the aerofoil is greater than the corresponding relative velocity of the air over the lower surface. Where an aerofoil shield 22 is being moved through still air, as is supposed in FIG. 3, the consequence must therefore be that the passage of the aerofoil imparts some rearward horizontal velocity $V_1$ to the air where arrow 27 is located, immediately above the level at which the aerofoil moves, and some forward horizontal velicty $V_2$ to the air in region of arrow 28 below it, that is to say to the air very close to the top surface 16 of the crop canopy. The effect of this velocity $V_2$ will be to tend to deflect individual items of the crop forwards, as shown diagrammaticlly at 29, thus facilitating a better access of the spray 21 to the tops of those items.

Figure 6:
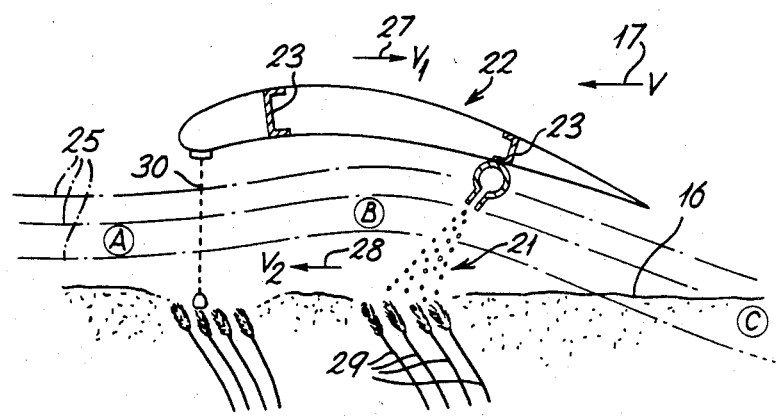
FIG. 6 is a view similar to FIG. 3 but showing an alternate embodiment.

Additionally, or as an alternative, as shown in FIG. 6 similar deflection of the items of the crop could also be promoted by a physical deflector 30 fixed to the leading edge 13 of the shield 22 and projecting downwards into the crop canopy. Such a deflector would of course have to be of open-work construction, for instance of wire mesh as shown, in order to avoid any substantial distortion of the important air flow pattern beneath the shield.

Figure 4:
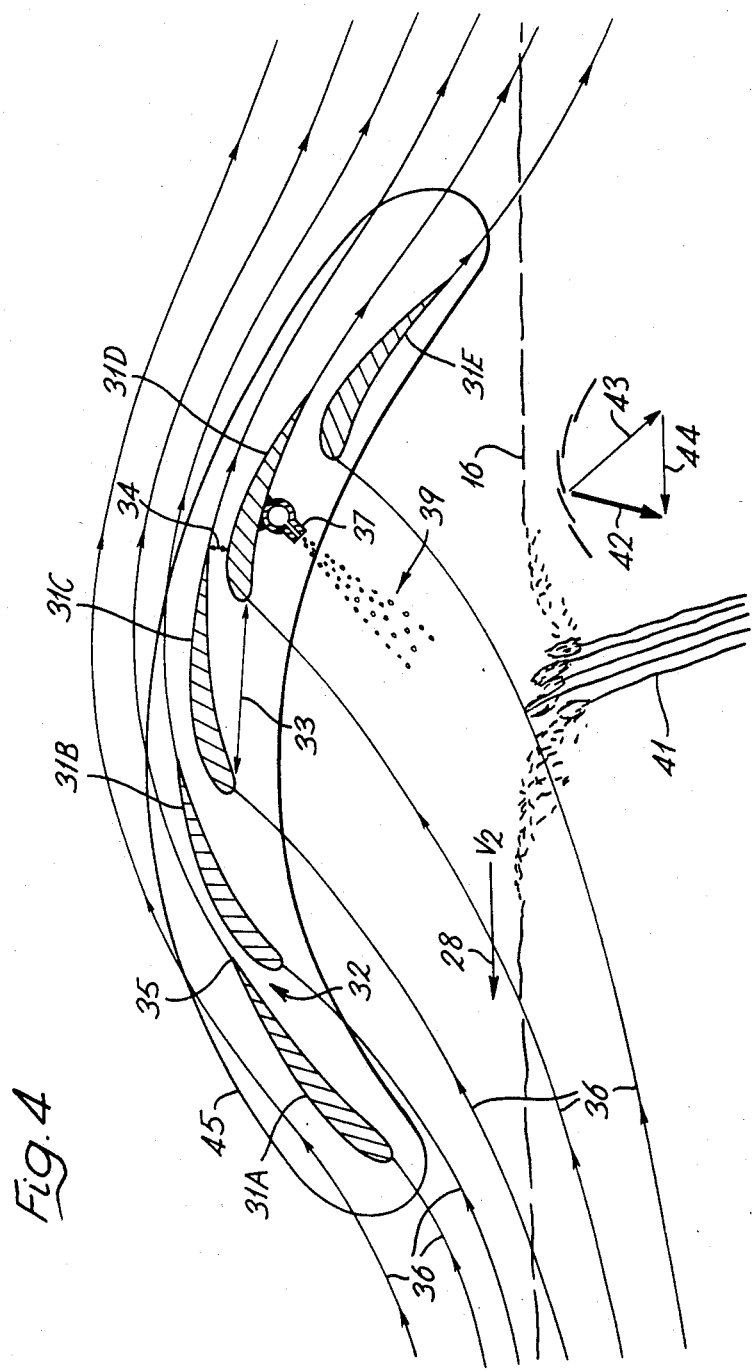
FIG. 4 is a similar section through another shield.

At the slow forward speeds typical for crop spraying from ground equipment, the Reynolds Number of the flow relative even to an aerofoil-shape shield as shown in FIG. 3 may be such that the air closest to the top surface of the shield does not stay attached, but separates. In such an event the ability of the shield to generate the vital movement of the air beneath it—downwards and slightly forwards relative to the crop, as already described—will be impaired. To avoid this a multi-element shield as shown in FIG. 4 is proposed. As seen in section, the envelope of all the elements 31A to E conforms to the outline of a highly-cambered aerofoil but each individual element 31 is so positioned relative to adjacent elements as to form a slot 32 which tapers from a maximum gap 33 at its inlet on the under surface of the shield to a minimum gap 34 at the outlet on the top surface of the shield. The purpose of slots 32 is to allow a small continuous flow of air upwards through the shield by way of the slots, as a result of which flow the boundary layer air on the top surface of a more forward element (e.g. 31A) leaves it at the trailing edge 35 of that element, allowing a new boundary layer to form on the surface of the next more rearward element 31B. In this way flow separation is avoided and the overall flow of air through and over the shield follows a pattern schematically indicated by the streamlines 36. It will be appreciated that the wider apart the streamlines are, the slower the flow relative to the shield that they represent. It can be seen that each of the elements 31 is positively cambered in order to help guide the flow into the slots 32. The flow must leave the slots in a direction nearly parallel to the upper surface of the more rearward of the two elements that defines the outlet gap 34. FIG. 7 also shows alternative positions 37 and 38 for spraying nozzles. When in position 37 the effect of the nozzle and of the spray 39 resulting from it is comparable with that of the spray 21 from nozzle 8 as illustrated in FIG. 3, and is particularly suited to efficient treatment of the top of a crop, especially when deflected by air with forard velocity $V_2$ and/or a mechanical deflector 30 as described with reference to that Figure. With the nozzle in the alternative position 38, so that it directs a spray 40 generally in a rearward direction relative to the shield, the attack of the spray to the deflected crop is likely to be more vertical and thus more suited to achieve deeper penetration towards the stems 41. As the insert to FIG. 4 shows vectorially, the direction and velocity 42 of the spray relative to the crop will be the resultant of the direction and velocity 43 of the spray relative to the shield, and the forward velocity 44 with which the shield is moving.

When the air is not still but there is a headwind, that is to say a wind from left to right in FIG. 4, the main part of the air flow will be deflected over the top of the shield and the velocity under it relative to the crop will have less of a forward motion than would otherwise be the case. The quantity $V_2$ may even be negative, but the effect of the headwind should be lower beneath the shield than anywhere else. Correspondingly a following wind will tend to make $V_2$ greater than would otherwise be the case, but again the effect of the following wind (that is to say, from right to left in FIG. 4) will be less beneath the shield than anywhere else.

As already described with reference to FIGS. 1 and 2, the shield 12 may be mounted on and supported by the boom of a standard spraying machine. Alternatively, as shown in FIG. 3 for instance, the shield 22 itself may be robust enough to act as the structural member which supports the supply conduit of the nozzles and is itself supported from the vehicle. Where the shield is of multi-element kind as shown in FIG. 4 it will be necessary to connect the elements at intervals with fin members 45. The spanwise spacing of these fins will be dictated by the stiffness requirements of the structure and the natural break points if the boom is collapsible, by folding or otherwise.

Figure 5:
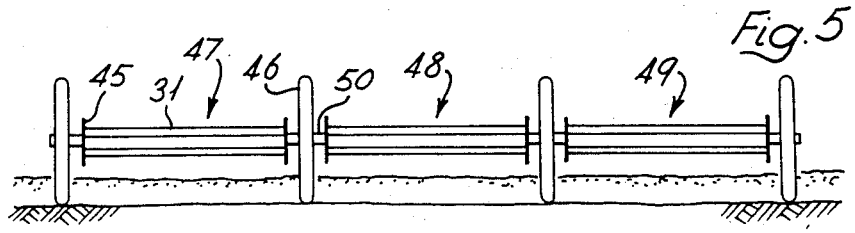
FIG. 5 is a diagrammatic elevation of spraying apparatus using examples of the shield of FIG. 4.

Instead of being mounted on a vehicle from which it projects sideways supported by a boom, or so as itself to act as such a boom, a shield according to this invention may as an alternative comprise multiple elements 31 supported by ribs 45 and mounted on wheels 46 as shown in FIG. 5. For a low-height crop this is attractive in that the height of the shield (and of the nozzles (not shown) carried by it) above the local ground level can be controlled very effectively. FIG. 5 shows a spraying device with three separate spans of shield 47, 48 and 49 each comprising elements supported by ribs 45 and mounted on axles 50. The device also comprises four wheels 46, the inner two wheels being flexibly jointed to the axles on either side of them. With such an articulated construction, accurate height above the local ground level can be obtained even when that ground has some three-dimensional curvature. The sort of device shown in FIG. 5 may be self-propelled but could also be towed, preferably in a manner offset from the towing vehicle so that the wheels of the latter avoid contact with the crop.

It will of course be appreciated that all the shields that have been described, apart from having the specific effects of the present invention, will also tend to improve the performance of otherwise unshielded nozzles by affording some protection against interference with the spraying by wind and other normal weather effects.

What is claimed is:

1. A method of spraying a target surface comprising:
   locating a spray boom, formed with a plurality of spray-discharge nozzles, on a ground-supported vehicle so that said boom is mounted in air close to said target surface, and directing said nozzles towards that surface;
   creating relative motion between said boom and said target surface in a direction parallel to said target surface;
   and securing in fixed relationship to said boom, and on the side of said boom that is remote from said target surface, a guiding surface which interacts with said air so that as said boom traverses said target surface said air following said nozzles and lying between them and said target surface is caused to move towards said target surface, so enhancing the incidence upon said target surface of said spray discharged from said nozzles.

2. A method of spraying according to claim 1 in which said target surface is horizontal and is sprayed from above.

3. A method of spraying according to claim 1, in which said target surface is the canopy of a standing crop or of another mass of elements that are capable of deflection, and in which said movement of said air towards said target surface caused by said interaction with said guiding surface tends to penetrate said mass of elements and deflect them, so exposing to said spray regions of said mass lying beyond said canopy.

4. Apparatus for spraying a target surface comprising:
   a ground-supported vehicle, adapted for horizontal movement relative to a horizontal target surface;
   a spray boom formed with a plurality of spray-discharge nozzles, mounted on said vehicle, said nozzles being directed so as to discharge a spray onto said target surface when separated therefrom by a small vertical clearance;
   a shield of generally arcuate section, also mounted on aid vehicle and arranged on the side of said spray boom remote from said target surface, with the radially-inner face of said arcuate shield facing towards said spray boom and said target surface, whereby to coact with said spray when said vehicle is in motion so as to enhance the incidence of said spray upon said target surface.

5. Apparatus according to claim 4 in which said shield is angled so that said vertical clearances between said target surface and said shield at its forward and rearward ends respectively relative to said horizontal movement are unequal, the clearance at said forward end being the greater.

6. Apparatus according to claim 4 in which said shield is of aerofoil section, and capable of being so set in use that when subjected to said horizontal movement the effect is to create in the air in said vertical clearance between said shield and said target surface a component of movement of air in the same direction as that in which said shield itself is moving.

7. Apparatus for spraying a target surface comprising:
   a vehicle, adapted for horizontal movement relative to a horizontal target surface with small vertical clearance therefrom;
   at least one spraying nozzle mounted on said vehicle, and directed so as to discharge a spray onto said target surface;
   a shield of generally arcuate section, also mounted on said vehicle and arranged on the side of said nozzle remote from said target surface, with the chord of the arc substantially parallel to the direction of said movement of said vehicle and with the radially-inner face of said arcuate shield facing towards said nozzle and said target surface, whereby to coact with said spray when said vehicle is in motion so as to enhance the incidence of said spray upon said target surface,
   in which said shield is of aerofoil section, and capable of being so set in use that when subjected to said horizontal movement the effect is to create in the air in said vertical clearance between said shield and said target surface a component of movement of air in the same direction as that in which said shield itself is moving, and in which said shield is made up of a plurality of elements, each aerofoil section, said elements being arranged in interrupted succession from fore to aft relative to said horizontal movement so that the envelope of said plurality of elements conforms to the outline of a highly-cambered aerofoil, with gaps between adjacent said elements.

8. Apparatus according to claim 1 in which the rear end relative to said horizontal movement of said aerofoil section of each more forward said element horizontally overlaps and vertically overlies the forward end of the adjacent and following said element, said two elements being so arranged that their confronting surfaces define a gap of steadily decreasing clearance for air passing through in the fore-to-aft direction, that is to say the direction in which air will tend to be forced through said gap as said shield makes said horizontal movement.

* * * * *